April 9, 1963  C. FREJACQUES  3,085,086
METHOD OF NITRATING CELLULOSE
Filed May 5, 1958
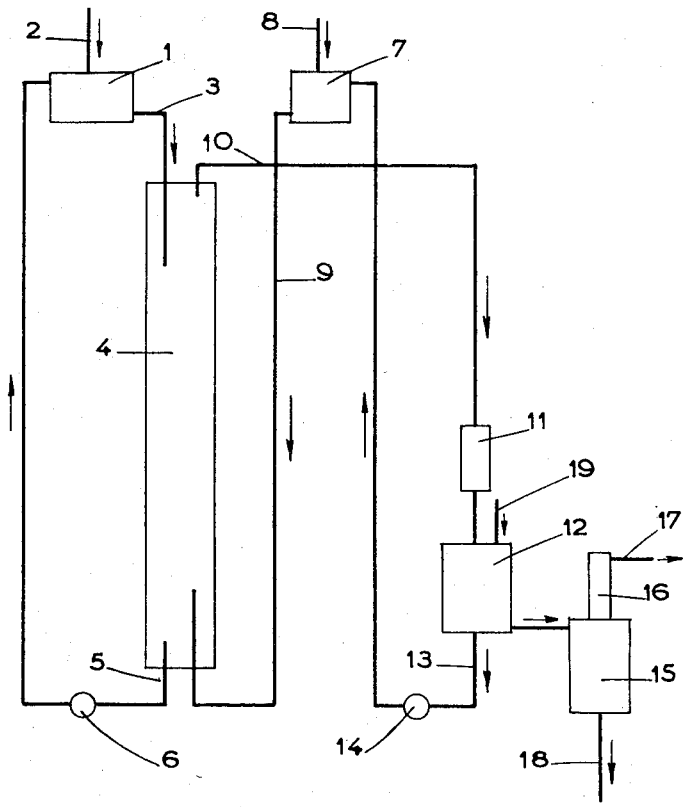
INVENTOR
Claude FREJACQUES
By
MEAD, BROWNE, SCHUYLER & BEVERIDGE
ATTORNEYS 3,085,086
METHOD OF NITRATING CELLULOSE
Claude Frejacques, % Ministry of National Defence and Armed Forces (Gun Powder Dept.), 12 Blvd. Henri IV, Paris, France
Filed May 5, 1958, Ser. No. 733,184
Claims priority, application France May 10, 1957
4 Claims. (Cl. 260—220)

The method which is most generally applied on an industrial scale for the preparation of nitro-cellulose consists in treating cellulose through a very large excess of sulfonitric acid. After reaction, the nitro-cellulose is drained and is thrown into an excess of water after which it is boiled during a very long time, with a view to obtaining a stable product.

Said method shows the drawback of being hardly reliable, since the product may become readily inflamed during the nitration and still more during the draining, while said method leads to an unnecessary consumption of acid fractions which are carried along with the drained nitro-cellulose and lastly, it is necessary to resort to a protracted and expensive stabilization of the nitro-cellulose obtained.

It has been proposed furthermore to proceed with the nitration of the cellulose through admixture of nitric acid with methylene chloride (dichloromethane) in the proportion of 60 to 40 or thereabouts. This method has provided directly stable nitro-cellulose and it is comparatively reliable. It has however never been applied to a large extent for industrial purposes by reason of the impossibility of recycling economically the nitric acid contained in the methylene chloride, which is itself in large excess with reference to the nitro-cellulose.

The present invention has for its object to cut out the drawbacks of these known methods and to allow the obtention through a reliable method of a stable nitro-cellulose under economical conditions which are at least as favorable as those obtained with the conventional industrial methods.

Said invention relies on the fact discovered by the inventor that when the methylene chloride or the like incompletely substituted chlorinated aliphatic derivative is set in contact with a sulfo-nitric bath similar to those used for the nitration of cellulose, the methylene chloride or the like chlorinated derivatives is loaded with a substantial proportion of nitric acid (5 to 29% or thereabouts) while, in contradistinction, it is loaded only with very small amounts of sulfuric acid (0.02%).

Under such conditions, one of the chief features of the invention consists in proceeding with the actual nitration through a mixture of the chlorinated derivative and of nitric acid as conventional in the art, while the spent mixture is set in contact with sulfonitric acid, the composition of which may be similar to that of the sulfo-nitric mixtures generally used for nitration. After separation of the nitro-cellulose, the reaction mixture diluted by the reaction water and the contents of nitric acid of which have been thus lowered is set thus in contact with a sulfonitric mixture, so as to form two phases from which the mixture of chlorinated derivative and nitric acid having the desired composition is tapped off through mere separation and returned into the reaction vessel. This contacting may be performed inside a conventional liquid-phase exchanging column.

As a matter of fact, the sulfo-nitric mixture supplies continuously the nitration mixture with the nitric acid which is to replace the nitric acid consumed, while the sulfo-nitric acid present in the mixture absorbs the water formed during the nitration. The cycle of operation of the sulfo-nitric acid is thus very near that corresponding to the conventional method and, from this standpoint, the procedure is similar to that of the conventional method.

As far as the mixture of a chlorinated derivative with the nitric acid is concerned, it should be remarked that, in practice, the nitrating ratio:

$$\frac{\text{Weight of the nitrating mixture}}{\text{Weight of the cellulose}}$$

should be larger than with the conventional method, without this having any influence on the procedure.

The ratio of the nitrogen in the nitro-cellulose obtained is defined by the composition of the sulfo-nitric acid used and by the conditions of operation.

In practice, and after nitration, the nitro-cellulose may be, for instance, compressed or drained and set under water, after which the chlorinated derivative carried along by the nitro-cellulose is recovered through distillation. The distilled chlorinated derivative may either be recycled into the circuit feeding the mixture of chlorinated derivative and nitric acid, or else it may be added to the drained nitro-cellulose which is then subjected to a second draining, with a view to reducing the losses of nitric acid carried along with the nitro-cellulose.

The nitro-cellulose obtained is not sufficiently stable in the absence of any further treatment by reason of the presence of small amounts of sulfuric acid still contained in the mixture of chlorinated derivative and of nitric acid serving for nitration purposes.

It has been found, and this forms a further feature of the method, that it is not necessary to proceed with the conventional expensive treatment required for stabilization and that it is sufficient to make the nitrating mixture pass before the nitrating step over an alkaline or alkaline earth nitrate and preferably over pulverulent sodium nitrate with a view to removing any small objectionable remaining amounts of sulfuric acid. This leads, as a matter of fact, to an exchange between the anions: the traces of sulfuric acid are fixed in the form of an alkaline sulfate, and release the corresponding amount of nitric acid. The nitro-cellulose obtained through action of the mixture of a chlorinated derivative with the nitric acid is then stable without any subsequent stabilizing treatment being required.

Furthermore, by reason of the presence of the chlorinated derivative, which, in the base of methylene chloride, for instance, boils at 40° C., on the one hand, and of the small amount of nitric acid present in the mixture, on the other hand, the method is very reliable, since a local heating cannot lead to any ignition. The acids are recovered more efficiently than in the case of the conventional methods and only the small amount of nitric acid remaining in the nitro-cellulose after draining is lost.

Lastly, the nitro-cellulose obtained being stable, this cuts out the conventional expensive stabilizing treatments, whereby the method according to the invention is more economical as a whole than the usual methods applied for industrial purposes.

The single FIGURE of the accompanying drawing illustrates by way of example and by no means in a limiting sense a diagrammatic showing of a plant for the execution of the method resorting to methylene chloride as a chlorinated derivative.

In the drawing, 1 designates the container of sulfo-nitric acid suitably fed into it at 2 and flowing through a pipe 3 into the upper section of the liquid phase exchange tower 4. At the lower end of said tower, a pipe 5 collects the liquid and returns it through the agency of a pump 6 into the storage container 1. 7 designates the storage container for a mixture of methylene chloride and nitric acid which is fed at 8 with the methylene chloride and out of which the mixture flows through a pipe 9 leading to the lower end of the exchange tower 4. The nitrating mixture is removed at 10 from the upper section of the exchange tower 4, so as to be fed into the vessel 11 inside which the sulfuric acid is caused to act on sodium nitrate. 12 designates the actual nitrating apparatus associated with the draining apparatus and fed with cellulose at 19. 13 designates the channel returning the spent nitrating liquid into the container 7 through the agency of a pump 14, while a boiler 15 serves for receiving the drained cellulose from the nitrating apparatus 12. The upper end of said boiler opens into a recovering column 16 providing for the recovery of the methylene chloride which is collected at 17. 18 designates the port through which the nitro-cellulose is removed.

The arrangement which has just been described operates as follows: the mixture of methylene chloride with nitric acid which still contains some traces of sulfuric acid is fed from the tower 4 through the pipe 10 into the exchanger vessel 11 wherein the small amounts of sulfuric acid remaining in the mixture are transformed, as already mentioned, into sodium sulfate, so that the actual nitration is performed inside the nitrating apparatus 12 fed with cellulose at 19 solely under the action of nitric acid in the presence of methylene chloride. The nitro-cellulose formed is drained inside the apparatus 12 and then fed into the boiler 15, so that the methylene chloride may be driven out through distillation. The nitro-cellulose is then removed at 18 at the bottom of the boiler, while the methylene chloride recovered inside the column 16 is removed at 17 and returned if desired into the container 7.

The mixture of nitric acid, of methylene chloride and of water due to the nitrating reaction is returned through 13 and the pump 14 into the container 7, where it is admixed with the stock of methylene chloride, after which it is fed by the channel 9 into the lower end of the exchange tower 4. In this exchange tower, the mixture of methylene chloride, nitric acid and water is set in countercurrent relationship in contact with the sulfo-nitric acid, so as to release its water and to become laden with nitric acid; an equivalent amount of the mixture thus reformed is tapped off at 10 and the cycle of operations continues in the manner already disclosed.

Furthermore, the sulfo-nitric acid from the container is poured out permanently into the column 4 in which the above-mentioned exchange is performed. Said sulfo-nitric acid is removed at 5 at the lower end of said tower, so as to be returned to the stock and treated in a manner similar to that used according to the conventional method of attacking cellulose by sulfo-nitric acid.

A few examples of the method according to the invention are given hereinafter:

*Example I*

A mixture of methylene chloride and nitric acid is obtained through exchange between methylene chloride and a sulfo-nitric acid having the following composition by weight:

| | Parts |
|---|---|
| Sulfuric acid | 56 |
| Nitric acid | 30 |
| Water | 14 |

This mixture is caused to pass over a fraction of the cellulose. After nitration, the mixture is recycled and caused to react with the same sulfo-nitric mixture.

The nitration continues during one hour at 18° C.

The nitro-cellulose obtained is drained, washed with water and boiled during one hour. There is produced 1.66 parts of nitro-cellulose with nitrogen contents of 12.8.

*Example II*

A mixture of methylene chloride and nitric acid is obtained through exchange between methylene chloride and a sulfo-nitric acid having the following composition by weight:

| | Parts |
|---|---|
| Sulfuric acid | 61 |
| Nitric acid | 20 |
| Water | 11 | which mixture is first caused to pass over a layer of pulverulent sodium nitrate.

The final mixture obtained after exchange reacts on the cellulose and is constantly recycled and reformed after nitration through exchange with the sulfo-nitric mixture.

The nitration continues during one hour and a half at 25° C. The nitro-cellulose is drained. Two parts by weight of methylene chloride are added to the nitro-celluose and a second draining is performed. The nitro-cellulose obtained is caused to boil in water during two hours, which allows recovering the methylene chloride carried along, and it is finally crushed. There is obtained 1.72 parts of nitro-cellulose having nitrogen contents equal to 13.6, said nitro-cellulose being stable when subjected to the Taliani test and to the standard test at 110° C.

Obviously, many modifications may be brought to the method disclosed, without unduly widening the scope of the invention as defined in the accompanying claims and, in particular, it is possible to replace, if desired, the methylene chloride by any other chlorinated aliphatic derivative which is not completely substituted such as chloroform or the like, either singly or in admixture.

What I claim is:

1. In a method of continuously nitrating cellulose by means of a nitrating mixture consisting of nitric acid and an incompletely chlorinated lower aliphatic hydrocarbon of low molecular weight the improvement consisting of a method of regenerating a spent water containing nitrating mixture comprising the steps of admixing said spent mixture with sulfonitric acid to form a first aqueous sulfonitric acid phase and a second incompletely chlorinated hydrocarbon phase containing large amounts of nitric acid and small amounts of sulfuric acid, passing said second phase through a nitrate selected from the group consisting of an alkali metal nitrate and an alkaline earth metal nitrate to neutralize the sulfuric acid therein, and recycling said second phase into the nitrating mixture.

2. The method of claim 1 in which the partially chlorinated lower aliphatic hydrocarbon is methylene chloride.

3. The method of claim 1 in which the partially chlorinated lower aliphatic hydrocarbon is chloroform.

4. The method of claim 1 in which the partially chlorinated lower aliphatic hydrocarbon is methylene chloride and the nitrate is sodium nitrate.

References Cited in the file of this patent

UNITED STATES PATENTS

| 2,122,173 | Brown | June 28, 1938 |
| 2,238,444 | Fravel | Apr. 15, 1941 |
| 2,259,494 | Sillick | Oct. 24, 1941 |
| 2,291,169 | Moos | July 28, 1942 |
| 2,737,372 | Carter | Mar. 6, 1956 |
| 2,776,965 | Bennett et al. | Jan. 8, 1957 |
| 2,776,966 | MacMillan et al. | Jan. 8, 1957 |